(12) United States Patent
Yang et al.

(10) Patent No.: US 10,467,085 B2
(45) Date of Patent: Nov. 5, 2019

(54) FAULT PROCESSING METHOD, SYSTEM, AND COMPUTER PROGRAM PRODUCT

(71) Applicant: EMC IP Holding Company LLC, Hopkinton, MA (US)

(72) Inventors: Lifeng Yang, Beijing (CN); Xinlei Xu, Beijing (CN); Ruiyong Jia, Beijing (CN); Liam Xiongcheng Li, Beijing (CN); Jibing Dong, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 87 days.

(21) Appl. No.: 15/629,583

(22) Filed: Jun. 21, 2017

(65) Prior Publication Data
US 2017/0364404 A1    Dec. 21, 2017

(30) Foreign Application Priority Data
Jun. 21, 2016  (CN) .......................... 2016 1 0451127

(51) Int. Cl.
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0793* (2013.01); *G06F 11/0769* (2013.01)

(58) Field of Classification Search
CPC . G06F 11/079; G06F 11/0793; G06F 11/0709
See application file for complete search history.

(56) References Cited

U.S. PATENT DOCUMENTS

| | | | |
|---|---|---|---|
| 8,260,974 B1 | 9/2012 | Fredette et al. | |
| 9,110,898 B1 | 8/2015 | Chamness et al. | |
| 9,641,615 B1 | 5/2017 | Robins et al. | |
| 9,652,320 B2* | 5/2017 | Shah | G06F 21/10 |
| 2004/0221198 A1* | 11/2004 | Vecoven | G06F 11/0727 714/25 |
| 2006/0045027 A1* | 3/2006 | Galou | H04L 41/12 370/255 |
| 2009/0210283 A1* | 8/2009 | Miyamoto | G06F 11/0748 705/7.14 |
| 2010/0218030 A1* | 8/2010 | Bhatnagar | G06F 11/0748 714/2 |
| 2015/0099510 A1* | 4/2015 | Shah | G06F 21/10 455/425 |

(Continued)

*Primary Examiner* — Yolanda L Wilson
(74) *Attorney, Agent, or Firm* — BainwoodHuang (57) ABSTRACT

Various embodiments of the present disclosure generally relate to a fault processing method, system and computer program product. Specifically, the method may comprise determining a plurality of devices to be detected and corresponding device attributes. The method may also comprise performing a first fault detection for the plurality of devices based on the device attributes, the first fault detection being based on a first fault diagnosis rule that is generic for the plurality of devices. Besides, the method may also comprise: in response to a first device in the plurality of devices being determined to have a fault in the first fault detection, performing a first fault processing to the first device, the first fault processing being based on a first fault processing rule that is generic for the plurality of devices.

15 Claims, 6 Drawing Sheets

(56) References Cited

U.S. PATENT DOCUMENTS

| | | | | |
|---|---|---|---|---|
| 2015/0227404 A1* | 8/2015 | Rajagopal | ........... | G06F 11/0748 |
| | | | | 714/37 |
| 2016/0103722 A1* | 4/2016 | Avadhanam | .......... | G06F 11/079 |
| | | | | 714/37 |
| 2016/0224406 A1* | 8/2016 | Ilic | ....................... | G06F 11/0748 |
| 2016/0292028 A1* | 10/2016 | Gamage | ................ | G06F 11/079 |
| 2016/0350173 A1* | 12/2016 | Ahad | .................. | G06F 11/3495 |

* cited by examiner

FAULT PROCESSING METHOD, SYSTEM, AND COMPUTER PROGRAM PRODUCT

RELATED APPLICATIONS

This application claim priority from Chinese Patent Application Number CN201610451127.4, filed on Jun. 21, 2016 at the State Intellectual Property Office, China, titled "A METHOD, SYSTEM, AND COMPUTER PROGRAM PRODUCT FOR FAULT PROCESSING" the contents of which is herein incorporated by reference in its entirety.

FIELD

Various embodiments of the present disclosure generally relate to the field of computers, and more specifically relate to a fault processing method, system, and a computer program product.

BACKGROUND

In a complex system combining a considerable number of various hardware, software and firmware, its reliability assurance is usually based on stability of a hardware platform. For example, for a complex storage system, its reliability assurance may involve the following aspects of the hardware platform such as a fault tolerance system (e.g., by redundancy), system diagnostic design, field failure monitoring and corrective actions, predictive and preventive maintenance, or other mechanisms for implementing system reliability.

However, in current actual applications, although the hardware platform has developed various methods for assuring reliability of a complex system, such methods are rather complex and independent of respective modules in the complex system. For example, for each hardware fault, the hardware platform has a unique detecting and processing method. Software of the hardware platform usually cannot reuse some generic solutions. Therefore, the hardware platform has poor scalability and serviceability for the complex system.

SUMMARY

Various embodiments of the present disclosure provide a fault processing method and system, and a computer program product.

According to a first aspect of the present disclosure, there is provided a fault processing method. The method may comprise determining a plurality of devices to be detected and corresponding device attributes. The method may also comprise performing a first fault detection for the plurality of devices based on the device attributes, the first fault detection being based on a first fault diagnosis rule that is generic for the plurality of devices. Besides, the method may also comprise: in response to a first device in the plurality of devices being determined to have a fault in the first fault detection, performing a first fault processing to the first device, the first fault processing being based on a first fault processing rule that is generic for the plurality of devices.

In an exemplary embodiment, the method may also comprise: in response to all of the plurality of devices being determined to be normal in the first fault detection, performing a second fault detection to at least one second device in the plurality of devices, the second fault detection being based on a second fault diagnosis rule that is specific to the second device.

In another exemplary embodiment, the method may also comprise: in response to the first device being still at least partially faulty after the first fault processing, performing a second fault processing for the first device, the second fault processing being based on a second fault processing rule that is specific to the first device.

In another exemplary embodiment, the method may also comprise: determining a critical level of the fault of the first device; and presenting the critical level to a user.

According to a second aspect of the present disclosure, there is provided a fault processing system. The system may comprise: a processor and a memory. The memory is coupled to the processor and stores instructions for execution by the processor. The instructions, when being executed by the processor, may cause the system to: determine a plurality of devices to be detected and corresponding device attributes; perform a first fault detection for the plurality of devices based on the device attributes, the first fault detection being based on a first fault diagnosis rule that is generic for the plurality of devices; and in response to a first device in the plurality of devices being determined to have a fault in the first fault detection, perform a first fault processing to the first device, the first fault processing being based on a first fault processing rule that is generic for the plurality of devices.

In an exemplary embodiment, the instructions, when being executed by the processor, may also cause the system to: in response to all of the plurality of devices being determined to be normal in the first fault detection, perform a second fault detection to at least one second device in the plurality of devices, the second fault detection being based on a second fault diagnosis rule that is specific to the second device.

In another exemplary embodiment, the instructions, when being executed by the processor, may also cause the system to: in response to the first device being still at least partially faulty after the first fault processing, perform a second fault processing for the first device, the second fault, processing being based on a second fault processing rule that is specific to the first device.

In a further exemplary embodiment, the instructions, when being executed by the processor, may also cause the system to: determine a critical level of the fault of the first device; and present the critical level to a user.

According to a third aspect of the present disclosure, there is provided a computer program product. The computer program product is tangibly stored on a non-transient computer readable medium and includes machine-executable instructions. The machine-executable instructions, when being executed, cause the machine to perform any step of the method depicted according to the first aspect of the present disclosure.

The Summary is provided to introduce a selection of concepts in a simplified manner They will be further described in the Detailed Description hereinafter. The Summary has no intention to identify key features or main features of the present disclosure, nor is it intended to limit the scope of the present disclosure.

BRIEF DESCRIPTION OF THE DRAWINGS

Through more detailed depiction of the exemplary embodiments of the present disclosure with reference to the accompanying drawings, the above and other objectives, features, and advantages of the present disclosure will become more apparent. In the exemplary embodiments of the present disclosure, same reference numerals generally represent same elements.

DETAILED DESCRIPTION OF EMBODIMENTS

The preferred embodiments of the present disclosure will be described in more detail below with reference to the accompanying drawings. Although the accompanying drawings illustrate the preferred embodiments of the present disclosure, it should be understood that the present disclosure may be implemented in various forms without being limited to the embodiments set forth herein. On the contrary, these embodiments are provided to make the present disclosure more thorough and complete and enable the scope of the present disclosure to be completely conveyed to those skilled in the art.

The term "comprise" and its variations used herein express an open inclusion, i.e., "including, but not limited to." Unless otherwise indicated, the term "or" means "and/or." The term "based on" indicates "at least partially based on." The terms "one exemplary embodiment" and "one embodiment" indicate "at least one exemplary embodiment." The term "another embodiment" indicates "at least one another embodiment." The terms "first" and "second" and so on may refer to different or same objects. Other explicit and implicit meanings may also be included hereinafter.

As described above, because the hardware platform has a poor scalability and serviceability for the complex system, the maintenance cost and time of the complex system increase.

In order to solve one or more of the above and other potential problems, exemplary embodiments of the present disclosure provide a fault processing method, system, and computer program product. Specifically, by extracting common portions of different kinds of faults and providing device plug-ins for specific faults, a uniform and extendable fault management framework is provided for a hardware platform of a complex system, thereby improving the serviceability and reliability of the complex system, implementing an automatic fault alarming, fault isolation, and recovery mechanism so as to save maintenance cost and reduce maintenance time.

Figure 1:
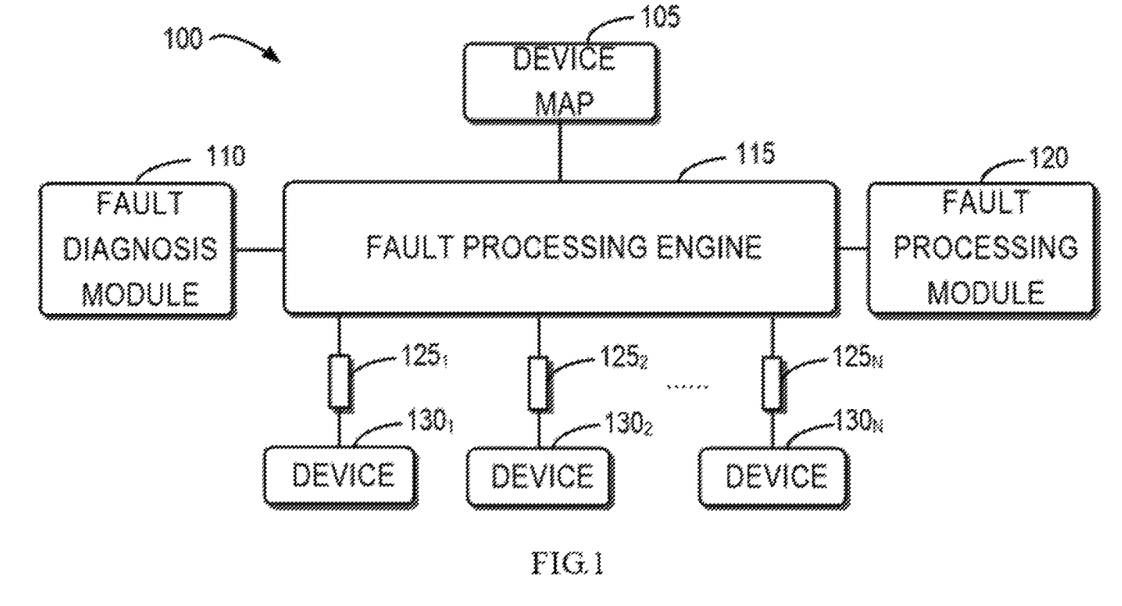
FIG. 1 illustrates a block diagram of a fault management system 100 for fault processing according to the embodiments of the present disclosure.

FIG. 1 illustrates a block diagram of a fault management system 100 for fault processing according to the embodiments of the present disclosure. It should be understood that the structure and functions of the fault management system 100 are described only for exemplary purposes, not for implying any limitation to the scope of the present disclosure. The embodiments of the present disclosure may be embodied in different structures and/or functions.

As illustrated in FIG. 1, the fault management system 100 may comprise a device map 105, a fault diagnosis module 110, a fault processing engine 115, a fault processing module 120, and device plugins $125_1$, $125_2$, ..., $125_N$ (generally referred to as "device plugins" 125), where N is a natural number. The fault processing engine 115 is coupled to the device map 105, the fault diagnosis module 110, the fault processing module 120, and device plugins 125. Moreover, via the device plugins 125, the fault processing engine 115 may access corresponding devices $130_1$, $130_2$, ..., $130_N$ (generally referred to as "devices" 130).

Devices 130 may be various kinds of hardware modules or devices, including, but not limited to, a storage device such as a floppy disk, a hard disk, an optical disk, a central processing unit (CPU), a network interface card (NIC), a host bus adaptor (HBA), etc. The device plugins 125 are interfaces for these devices 130, e.g., an application programming interface (API). A hardware driver (not shown) may invoke the device plugins 125 and register the devices 130 to the fault processing engine 115. The fault processing module 120 may report a fault that has been processed by the fault processing engine 115 to an administrator and recover or isolate the fault. In addition, the fault management system 110 may also support a callback interface defined by the user for some specific processing and reporting manners.

In particular, according to some embodiments of the present disclosure, the fault processing engine 115 may access the device map 105. The device map 105 stores devices 130 and their corresponding attributes. The fault processing engine 115 receives a plurality of devices 130 to be detected and their corresponding device attributes from the device map 105. Exemplary implementations and specific configurations of the device map 105 will be described hereinafter.

Based on the information above, the fault processing engine 115 may control the fault diagnosis module 110 to detect device faults in priority according to a general fault diagnosis rule. If a fault is detected, the fault processing engine 115 may control the fault processing module 120 to process the detected fault in priority according to a general fault processing rule. Only when the general diagnosis and/or processing rule is invalid, will the fault processing engine 115 may apply a diagnosis and/or processing rule that is specific to each device 130. It will be understood through the depiction below that the universality and scalability for hardware fault detection and processing can be significantly enhanced in this way.

Figure 2:
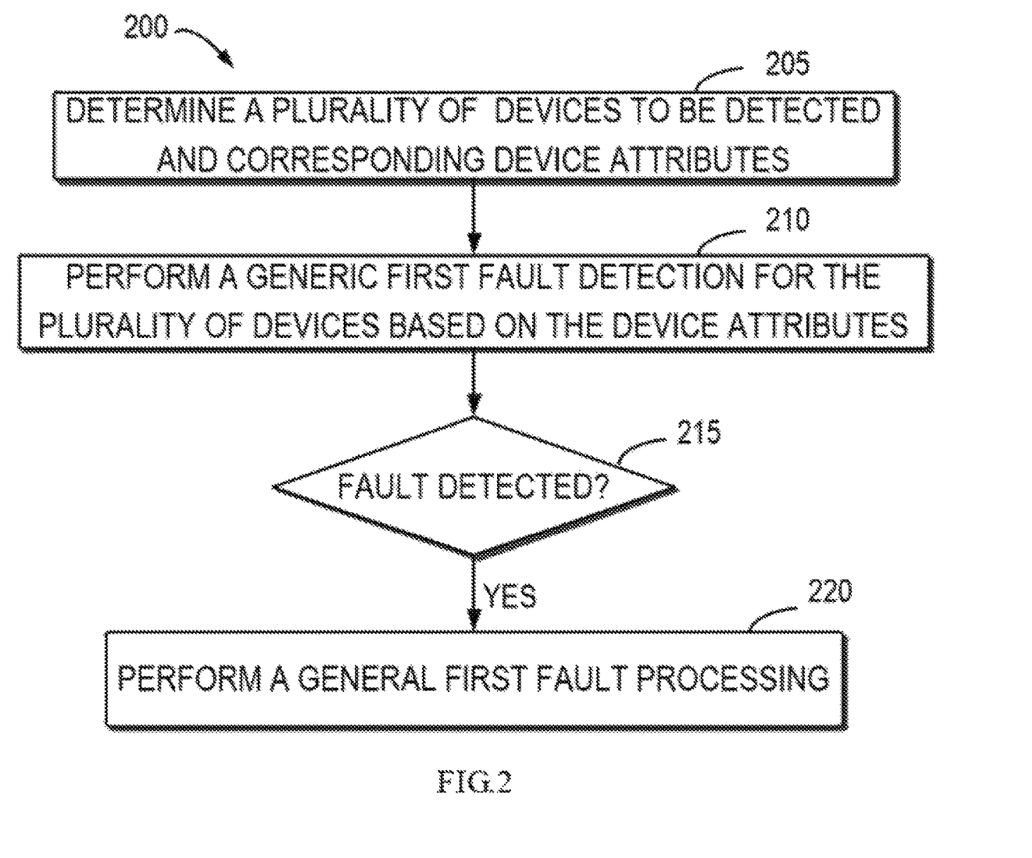
FIG. 2 illustrates a flow diagram of an exemplary method 200 for fault processing according to the embodiments of the present disclosure.

Hereinafter, FIGS. 2 to 6 will be referenced to further describe exemplary embodiments of the present disclosure. FIG. 2 illustrates a flow diagram of an exemplary method 200 for fault processing according to the embodiments of the present disclosure. For example, the method 200 may be executed by the fault management system 100 as illustrated in FIG. 1. It should, be understood that the method 200 may also comprise additional steps that are not shown and/or may omit, steps that are shown. The scope of the present disclosure is not limited in this aspect.

As illustrated in FIG. 2, in step 205, a plurality of devices 130 to be detected and corresponding device attributes are determined. In one embodiment, this, may be implemented by the device map 105. In some embodiments, the device map 105 may be implemented in a form similar to the Linux device tree, which records devices 130 in the fault management system 100 and their attributes. For example, in one embodiment, the device map 105 may be a database, which records a "hardware components map" of the device 131) which the user desires to monitor.

The device map 105 may be obtained through various kinds of appropriate manners. For example, in one embodiment, information in the device map 105 is designated by the user. In other words, the user may input or define which devices 130 are connected in the fault management system 100 and attributes of these devices through for example a user interface (UI). Alternatively or additionally, in some embodiments, determining a plurality of devices 130 to be detected may be determined by an automatic detection or discovery mechanism. For example, devices 130 connected to the system and corresponding device attributes may be determined by scanning the device 130. To this end, in one embodiment, after the devices 130 are registered, the fault processing engine 115 may indicate to traverse the existing system device structure that is sorted by a peripheral component interconnect (PCI) device map to generate a desired device map 105.

In step 210, fault detection is performed for the plurality of devices 130 based on device attributes, which is referred to as "first fault detection." According to the embodiments of the present disclosure, the first fault detection performed in step 210 is a general fault detection. In other words, the first fault detection is based on a fault diagnosis rule common to a plurality of devices 130 recorded in the device map 105, which is referred to as "first fault diagnosis rule." For example, the fault diagnosis module 110 is in charge of applying a diagnosis rule to hardware components. Specifically, when the fault management system 100 of the hardware platform starts, the fault diagnosis module 110 is based on the device attributes of the devices 130 indicated by the device map 105.

In step 215, it is determined whether at least one device in the plurality of devices 130 is determined to have a fault in the first fault detection. If no fault is detected, in some embodiments, the method 200 may return to step 205 (not shown in the figure) so as to repeat the above fault detection process. Alternatively, the method 200 may stop execution at this time. In some other embodiments, as will be described later with reference to FIG. 3, further fault detection may also be performed by applying a dedicated fault detection rule specific to each device 130 in this case.

On the other hand, if at least one faulty device (hereinafter referred to as "first device") is determined to be detected in step 215, the method 200 proceeds to step 220, where fault processing is performed for the first device (i.e., detected faulty device). The fault processing performed in step 220 may be referred to as "first fault processing," which is a general fault processing. In other words, the first fault processing is based on a fault processing rule common to the plurality of devices 130, referred to as "first fault processing rule."

In some embodiments, in step 220, a type of a fault of the first device may be determined, and then the first fault processing is performed based on the type of the fault. Types of the fault include, but not limited to, recoverable faults and irrecoverable faults. Specifically, in a fault management system 100 of the hardware platform, the following faults may occur: CPU fault, PCI bus fault (CMI and PCI adaptor interfaces), memory error, SLIC hardware/firmware fault, disk fault, cable damage (internal/external), application-specific integrated circuit (ASIC) hardware fault, chassis fault, power supply fault, etc. For example in response to determining that the fault type of a disk (hard disk, floppy disk, and optical disk) is an irrecoverable fault (e.g., physical damage of the disk), fault like a redundant array of independent disks (RAID) may be modified by replacing the disk. For another example, in response to determining that the type of the fault of the service processor is a recoverable fault (e.g., level value error), such error may be avoided through reconfiguration.

Figure 3:
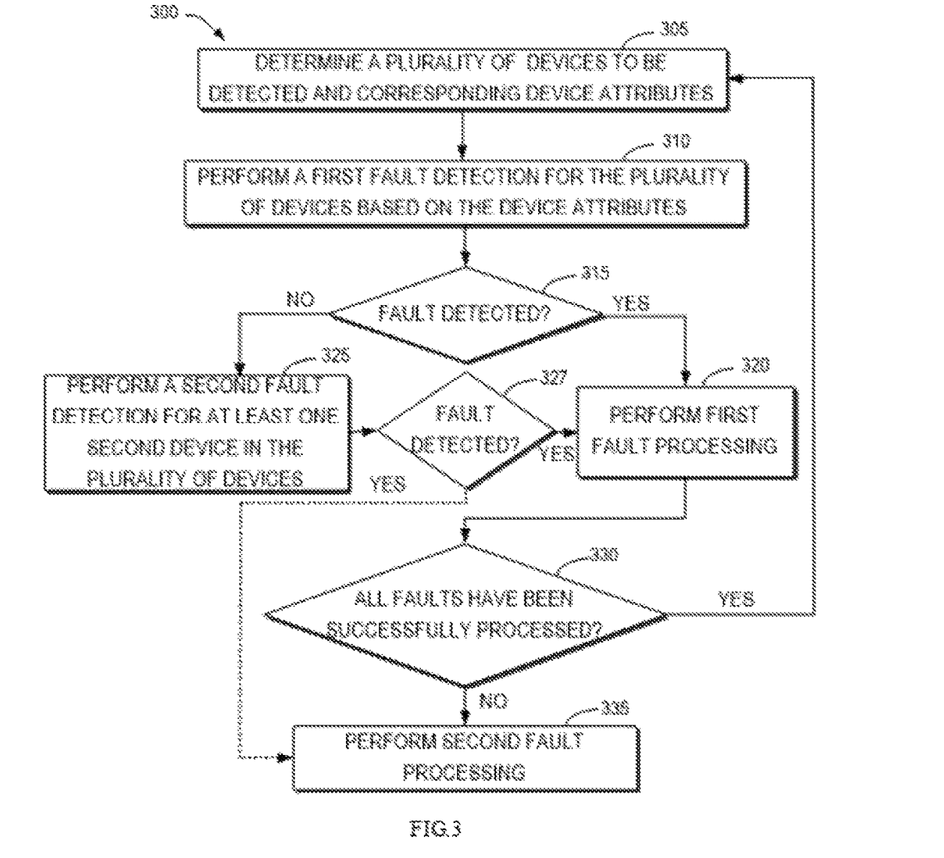
FIG. 3 illustrates a flow diagram of another exemplary method 300 for fault processing according to the embodiments of the present disclosure.

It may be understood through the description above that according to the embodiments of the present disclosure, the fault processing engine 115 first applies a general fault detection (first fault detection) and a general fault processing (first fault processing). However, because a complex system includes a considerable number of hardware, software and firmware, such a situation likely occurs, namely: the general first fault detection does not detect a fault that actually has occurred in the devices 130 or the general first fault processing fails to completely solve the fault of the faulty device (first device). In order to handle this occasion, in some embodiments, in the case that the general rules are invalid, the fault processing engine 115 may apply dedicated rules for specific devices 130. Next, FIG. 3 will be referenced to further describe this occasion, FIG. 3 illustrates a flow diagram of another exemplary method 300 for fault processing according to the embodiments of the present disclosure. As illustrated in FIG. 3, steps 305-320 correspond to steps 205-220 in FIG. 2, respectively, which will not be detailed here. If all to-be-detected devices 130 are determined to be normal in the first fault detection in step 315, the method 300 may proceed to step 325. In step 325, fault detection may be performed for at least one to-be-detected device in the plurality of devices 130. For example, in one embodiment, fault detection may be performed for each to-be-detected device 130. Alternatively, in some embodiments, fault detection may also be performed only to a part of devices 130 (e.g., important devices, and/or devices with a higher fault risk) in step 325.

The fault detection performed in step 325 is referred to as "second fault detection," which is based on a fault diagnosis rule that is specific to a to-be-detected device, referred to as "second fault diagnosis rule." The specific fault diagnosis rule is generated specifically based on the type, characteristics, and performance of respective different devices and is thus more pertinent than general rules. Moreover, in some embodiments, with operations such as updating and upgrading of the to-be-detected device 130, the fault processing engine 115 may extend the second fault diagnosis rule so as to better adapt change of the device 130. In one embodiment, the second fault detection that is specific to the to-be-detected device 130 may be implemented by a corresponding device plugin 125. In other words, the second fault diagnosis rule for the device 130 may be saved or maintained by a corresponding device plugin 125. For example, in actual application, each different device 130 may need a different fault diagnosis rule. For example, in response to a fan fault, a speed of the fan may be abnormal. However, for a hard disk fault, a considerable number of diagnosis rules need to be taken into account, e.g., media access fault, self-monitoring analysis and reporting technology (S.M.A.R.T) registration value. Therefore, the device plugin 125 is designed for registering its fault diagnosis rule and processing rule in the fault processing engine 115. In another situation, the fault diagnosis rule and processing rule may also be managed by the device 130/device plugin 125.

If it is determined in step 327 that a fault is detected through the second fault detection, in one embodiment, the method 300 may proceed to step 320. On the other hand, if no fault is detected through the second fault detection in step 325, it may be determined that the state of the device 130 is good; the method 300 may return from step 327 to step 305

(not illustrated) so as to perform next-round detection. Alternatively, the method 300 may also correspondingly terminate execution of this round.

In step 320, as mentioned above, a first fault processing based on the general fault processing rule is applied to the faulty device. Afterwards, the method 300 proceeds to step 330, where it is determined whether all detected faults have been successfully solved. If so, the method 330 may return to step 305 to continue execution of the fault detection and processing. On the other hand, if it is determined in step 330 that there still exist at least part of defaults after the first fault processing, the method 300 may proceed to step 335.

In step 335, a pertinent fault processing is executed for the faulty device, referred to as "second fault processing." The second fault processing is based on a second fault processing rule specific to the faulty device. In one embodiment, similar to the second fault diagnosis rule, the second fault processing rule may also be maintained by a corresponding device plugin 125 of the device 130 and may also be scalable.

It should be understood that the flow depicted above is not compulsory, but is variable according to specific application scenarios and needs. For example, in some embodiments, if it is determined that a faulty device is detected in the second fault detection in step 327, the method 300 may also proceed to step 335 (as illustrated in the dotted lines in FIG. 3) so as to apply a second fault processing procedure specific to the faulty device.

In some embodiments, in the first fault processing and/or second fault processing, the fault processing engine 115 may also determine a critical level of the detected fault, and present the critical level to the user. For example, the critical level of a fault may include: fatal error, critical error, general error, and warning. Specifically, the fatal error refers to an error that may cause the fault management system 100 of the hardware platform to crash, loss of the user data, or cause the storage device to stop service. In response to detection of such error, the fault processing engine 115 may immediately recover such error or isolate it and report it to the administrator.

The critical error refers to an error that possibly causes key functions invalid (e.g., storage performance degradation). The fault management system 100 of the hardware platform surely attempts to recover the error and report it to the administrator. The general error refers to an error that will not cause a serious problem. For a general error, the fault processing engine 115 may process the error and record information about the error for the administrator. Appearance of the warning will not cause a problem and even needn't processing; it is only needed to record the information about the error for logs.

The fault detection and processing procedures of the embodiments of the present disclosure have been described in detail with reference to FIGS. 2 and 3 above. Hereinafter, an example 400 for fault processing according to the embodiments of the present disclosure will be described hereinafter with reference to FIG. 4. It will be understood that the procedure described with reference to FIG. 4 may be regarded as a specific implementation of the methods 200 and 300 described above. The depiction, with reference to FIG. 4 is only enabling those skilled, in the art to better understand the spirit and principle of the embodiments of the present disclosure, without any intention to limit the scope of the present disclosure in any way.

Figure 4:
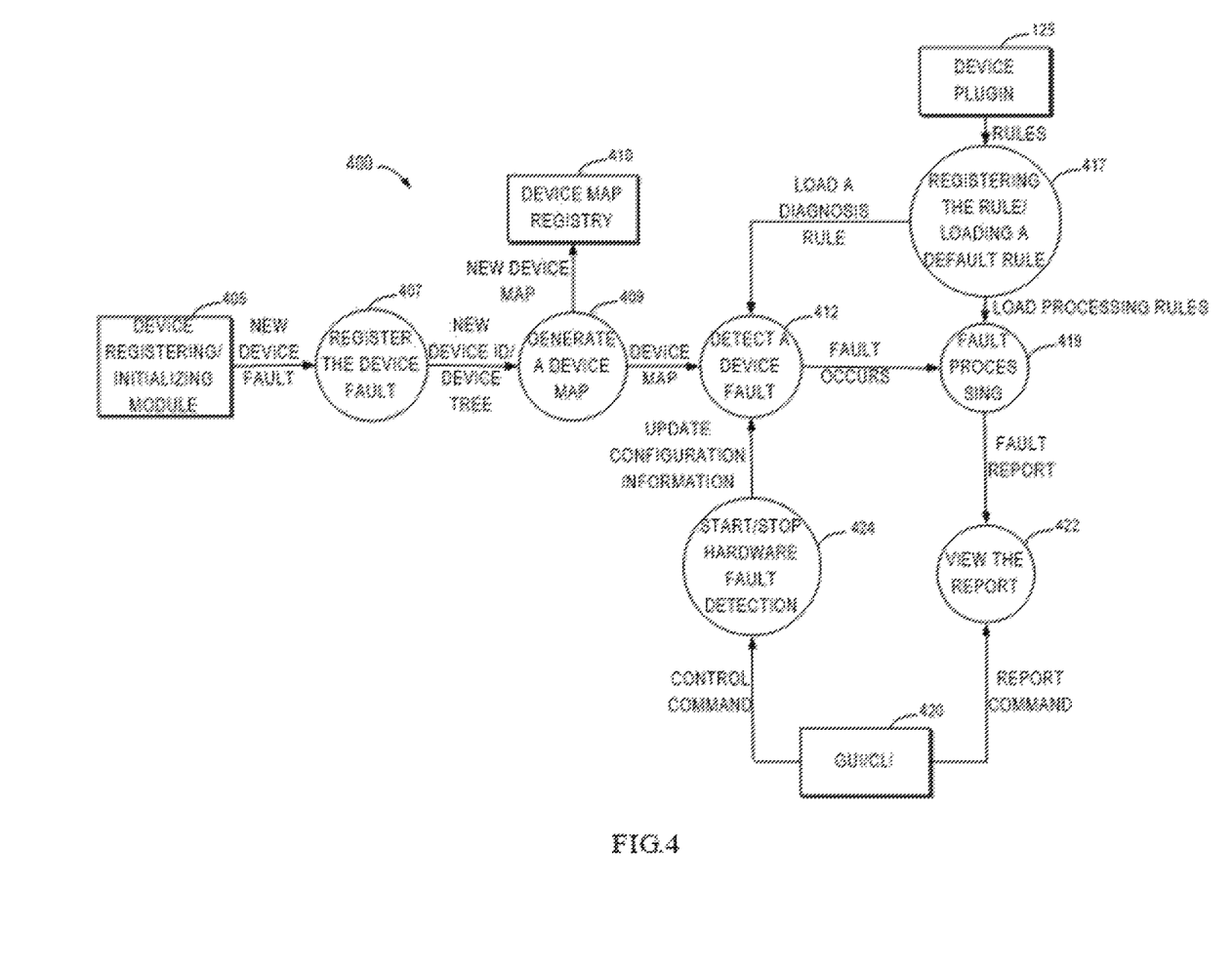
FIG. 4 illustrates an example 400 of fault processing according to the embodiments of the present disclosure.

In the embodiment shown in FIG. 4, at a start phase of the fault management system 100 of the hardware platform, the devices 130 may be scanned through a device registering/initializing module 405 so as to determine devices 130 connected to the fault management system 100 and corresponding device attributes, wherein the device attributes may include device faults of the devices 130. For example, a new device fault may include: mainboard component fault (including CPU, DIMM, host bridge, ASIC, embedded NIC and so on), chassis fault (including fan, temperature, and voltage), disks, power supply, interconnection (including fiber cable, network cable, SAS cable and CMI interface between two SPs (single processor)), and a driver/firmware/software fault.

After the device fault 407 is registered, the fault processing engine 115 may indicate to traverse the existing system device structure that is sorted by a peripheral control interface (PCI) device map, wherein the device structure may comprise a new device ID or device tree (device attribute information represented by a tree structure), thereby generating a desired device map 105 at 409. Alternatively, the fault processing engine 115 may store the newly generated device map 150 into a device map registry 410, wherein the device map registry table 410 may include one or more device maps 150 for the fault processing engine 115 to access so as to satisfy various purposes.

Based on the device map 150, the fault processing engine 115 may control the fault diagnosis module 110 to start/stop device fault detection at 424 through the API (e.g., GUI/CLI 420) and update the configuration information of the device map 150. If the fault diagnosis module 110 detects a fault at 412, the fault processing engine 115 may control the fault processing module 120 to process the detected fault in priority with a general fault processing rule. Only when the general diagnosis and/or processing rule does not take effect, will the fault processing engine 115 possibly load a diagnosis rule and a processing rule specific to each device 130 into the fault diagnosis module 110 and the fault processing module 120 by registering/loading rules at 417 via the device plugin 125. It may be understood through the description above that the universality and scalability of device fault detection and processing can be significantly enhanced in this way.

At 419, after the fault processing module 120 performs fault processing, a fault report may be generated. According to the fault type indicated in the fault report, the fault processing engine 115 may be available for the administrator to view the report at 422 via an API (e.g., GUI/CLI 420).

In addition, a default device plugin 125 may be provided by a fault management system 100 of a hardware platform to some common hardware, e.g., a CPU, a DIMM, and a chassis sensor, which is predefined with some diagnosis rules and processing rules of general hardware. For specific hardware or hardware with a complex rule, the device plugin 125 needs to be defined according to the needs. The fault management system 100 of the hardware platform also provides a GUI/CLI interface for the fault processing engine 115 to perform management, e.g., including a fault abstract report, configuration of diagnosis rules and processing rules, and device monitor management. In some embodiments, the device map 105 may include files and/or codes of any appropriate form, for describing respective devices 130 indicated in the device map 105 and the device attributes For example, these files and/or codes may describe system hardware that needs to be detected and processed by the fault management system 100 when a fault occurs and may be managed by the fault management system 100.

Figure 5:
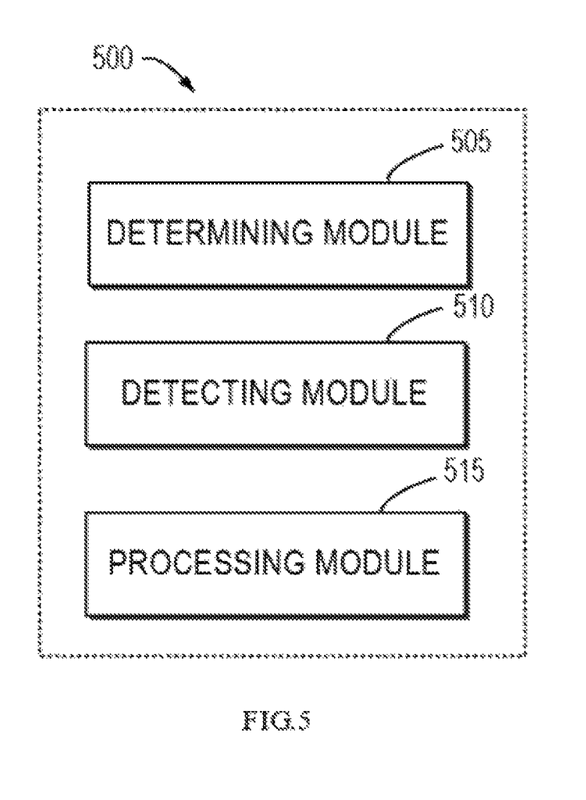
FIG. 5 illustrates a block diagram of an apparatus 500 for fault processing according to the embodiments of the present disclosure.

FIG. 5 illustrates a block diagram of an apparatus 500 for fault processing according to the embodiments of the present disclosure. For example, the fault processing method 200 may be implemented by an apparatus 500. As illustrated in FIG. 5, the apparatus 500 may comprise a determining module 505 configured to determine a plurality of devices to be detected and corresponding device attributes. The apparatus 501) may also comprise a first detecting module 510 configured to perform a first fault detection for the plurality of devices based on the device attributes, the first fault detection being based on a first fault diagnosis rule that is generic for the plurality of devices. Besides, the apparatus 500 may also comprise: a first processing module 515 configured to, in response to a first device in the plurality of devices being determined to have a fault in the first fault detection, perform a first fault processing to the first device, the first fault processing being based on a first fault processing rule that is generic for the plurality of devices.

In one embodiment, the determining module 505 may comprise a device map generating module configured to generate a device map indicating a plurality of devices and device attributes. In one embodiment, the determining module 505 may comprise one of the following: an input receiving module configured to receive user input designating a plurality of devices: and a device scanning module configured to determine a plurality of devices by scanning devices connected to a host.

In one embodiment, the apparatus 500 may further comprise a second fault detection module configured to: in response to all of the plurality of devices being determined to be normal in the first fault detection, perform a second fault detection to at least one second device in the plurality of devices, the second fault detection being based on a second fault diagnosis rule that is specific to the second device.

In one embodiment, the apparatus 500 may also comprise a first extending module configured to extend the second fault diagnosis rule specific that is to the second device.

In one embodiment, the apparatus 500 may also comprise a second processing module configured to: in response to the first device being still at least partially faulty after the first fault processing, perform a second fault processing for the first device, the second fault processing being based on a second fault processing rule that is specific to the first device.

In one embodiment, the apparatus 500 may also comprise a second extending module configured to extend a second fault processing rule that is specific to the first device.

In one embodiment, performing the first fault processing may comprise determining a type of the fault of the first device; and performing a first fault processing based on the type of the fault. In one embodiment, the types of the faults may include recoverable faults and irrecoverable faults.

In one embodiment, the apparatus 500 may also comprise: a critical level determining module configured to determine a critical level of the fault of the first device; and a critical level presenting module configured to present the user the critical level.

For the sake of clarity, FIG. 5 does not illustrate some optional modules of the apparatus 500. It should be understood that various features described with reference to FIGS. 1-4 are likewise applicable to the apparatus 500. Moreover, various modules of the apparatus 500 may be hardware modules or software modules. For example, in some embodiments, the apparatus 500 may be implemented partially or completely using software and/or firmware, e.g., implemented as a computer program product embodied on a computer readable medium. Alternatively or additionally, the apparatus 500 may be implemented partially or completely based on hardware, e.g., implemented as an integrated circuit (IC), an application—specific integrated circuit (ASIC), a system on chip (SOC), and a field programmable gate array (FPGA), etc. The scope of the present disclosure is not limited in this aspect.

Figure 6:
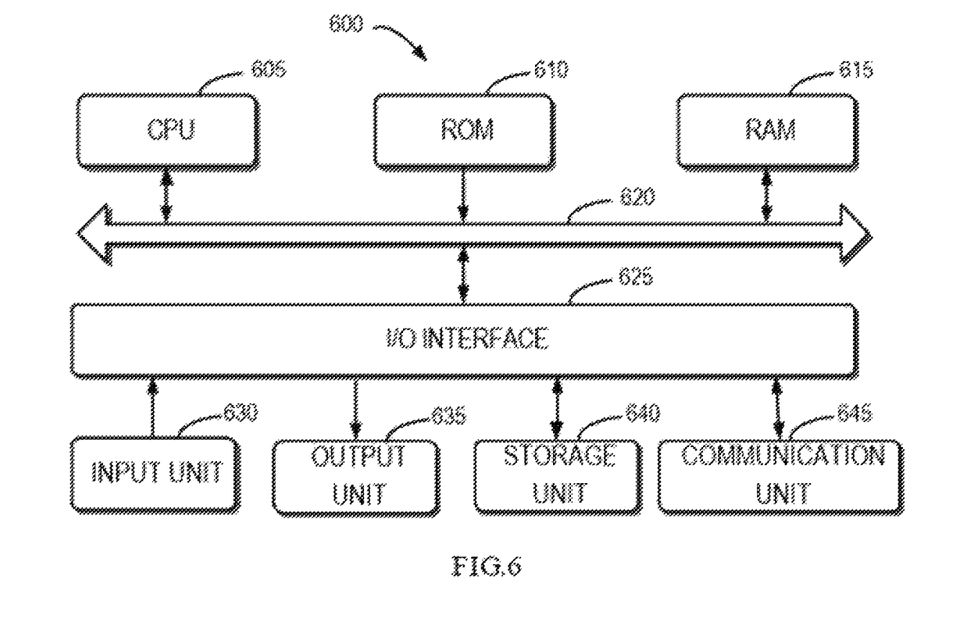
FIG. 6 illustrates a schematic diagram of an exemplary device 600 that may be used to implement the embodiments of the present disclosure.

FIG. 6 illustrates a schematic diagram of an exemplary device 600 that may be used to implement the embodiments of the present disclosure. As illustrated, the exemplary device 600 comprises a central processing unit (CPU) 605 which may perform various appropriate actions and processing according to computer program instructions stored in a read-only memory (ROM) 610 or computer program instructions loaded into the random access memory (RAM) 615 from the storage unit 640. In RAM 615, there may also store various kinds of programs and data needed for operations of the device 600. CPU 605, ROM 610, and RAM 614 are connected with each other via a bus 620. The input/output (I/O) interface 625 may also be connected to the bus 620.

A plurality of components in the device 600 are connected to the I/O interface 625, comprising: an input unit 630. e.g., a keyboard, a mouse, etc.; an output unit 635, e.g., various kinds of displays, loudspeakers, etc.; a storage unit 640, e.g., a magnetic disk, an optic disk, etc.; and a communication unit 645, e.g., a network card, a modem, a wireless communication transceiver, etc. The communication unit 645 allows the device 600 to exchange information/data with other device through a computer network such as Internet and/or various kinds of telecommunication networks.

Various procedures and processes described above, e.g., exemplary methods 200, 300, and 400, may be executed by a central processing unit 605. For example, in some embodiments, the exemplary methods 200, 300 and 400 may be implemented as computer software program which is tangibly embodied in a machine readable medium, e.g., a storage unit 640. In some embodiments, part or all of the computer program may be loaded and/or mounted onto the device 600 via ROM 610 and/or a communication unit 645. When the computer program is loaded to the RAM 614 and executed by the CPU 605, one or more steps in exemplary methods/processes 200, 300, and 400 described above may be executed. Alternatively, in other embodiments, the central processing unit 605 may be configured to implement the procedures/methods above in any other proper manners (e.g., firmware);

It may be seen from the description above that the embodiments satisfy requirements of fast deployment and flexible extension of data backup in a cloud computing environment by registering data backup as services. The embodiments of the present disclosure back up data of an application from a source node to a target node via a backup service proxy that may be encapsulated as an executable container, thereby implementing a loose coupling between the application and the target node. The embodiments of the present disclosure implement dynamic mapping from a backup service proxy to an application instance by providing flexible configuration to the backup service, such that the backup service can adapt various dynamic variations of the application (e.g., increase or decrease of instances of the application, or cross-node movement, etc.) and can be easily extended to support mass application instances. Besides, the data backup solution according to the embodiments of the present disclosure may also accommodate traditional performance and function requirements, such as a backup window requirement (e.g., RTO/RPO) and a media control operation requirement (e.g., supporting functions like deduplication, compression, or encryption, etc.).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card, or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions; acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A fault processing method, comprising:
determining a plurality of devices to be detected and corresponding device attributes, the plurality of devices including a first device, the first device having a fault;
performing a first fault detection operation to detect the fault of the first device based on the corresponding device attributes of the first device, the first fault detection operation being based on a first fault diagnosis rule that is generic for the plurality of devices;
in response to the fault of the first device being detected in the performing of the first fault detection operation, performing a first fault processing for the first device, the first fault processing being based on a first fault processing rule that is generic for the plurality of devices,
in response to the fault of the first device not being detected in the performing of the first fault detection operation, performing a second fault detection operation to detect the fault of the first device, the second fault detection operation being based on a second fault diagnosis rule that is specific to the first device; and
having detected the fault of the first device in the performing of the second fault detection operation, performing a second fault processing for the first device, the second fault processing being based on a second fault processing rule that is specific to the first device.

2. The method according to claim 1, wherein determining a plurality of devices to be detected and corresponding device attributes comprises:
generating a device map indicating the plurality of devices and the device attributes.

3. The method according to claim 1, wherein determining a plurality of devices to be detected and corresponding device attributes comprises at least one of:
receiving user inputs designating the plurality of devices; and
determining the plurality of devices by scanning devices connected to a host.

4. The method according to claim 1, further comprising:
extending the second fault processing rule that is specific to the first device.

5. The method according to claim 1, wherein performing the first fault processing comprises:
determining a type of the fault of the first device; and
performing the first fault processing based on the type of the fault.

6. The method according to claim 5, wherein the type of the fault includes a recoverable fault or an irrecoverable fault.

7. The method according to claim 1, further comprising:
determining a critical level of the fault of the first device; and
presenting the critical level to a user.

8. The method according to claim 1, further comprising:
in response to the first fault processing failing to solve the fault of the first device, performing the second fault processing for the first device, the second fault processing being based on the second fault processing rule that is specific to the first device.

9. A fault processing system, comprising:
a processor;
a memory coupled to the processor and storing instructions for execution by the processor, the instructions, when being executed by the processor, cause the system to:
determine a plurality of devices to be detected and corresponding device attributes, the plurality of devices including a first device, the first device having a fault;
perform a first fault detection operation to detect the fault of the first device based on the corresponding device attributes of the first device, the first fault detection operation being based on a first fault diagnosis rule that is generic for the plurality of devices;
in response to the fault of the first device being detected in the performing of the first fault detection operation, perform a first fault processing for the first device, the first fault processing being based on a first fault processing rule that is generic for the plurality of devices,
in response to the fault of the first device not being detected in the performing of the first fault detection operation, perform a second fault detection operation to detect the fault of the first device, the second fault detection operation being based on a second fault diagnosis rule that is specific to the first device; and
having detected the fault of the first device in the performing of the second fault detection operation, perform a second fault processing for the first device, the second fault processing being based on a second fault processing rule that is specific to the first device.

10. The fault processing system according to claim 9, wherein determining a plurality of devices to be detected and corresponding device attributes comprises:
generating a device map indicating the plurality of devices and the device attributes.

11. The fault processing system according to claim 9, wherein determining a plurality of devices to be detected and corresponding device attributes comprises at least one of:
receiving user inputs designating the plurality of devices; and
determining the plurality of devices by scanning devices connected to a host.

12. The fault processing system according to claim 9, wherein the instructions, when being executed by the processor, further cause the system to:
extend the second fault processing rule that is specific to the first device.

13. The fault processing system according to claim 9, wherein performing the first fault processing comprises:
determining a type of the fault of the first device; and
performing the first fault processing based on the type of the fault.

14. The fault processing system according to claim 13, wherein the type of the fault includes a recoverable fault or an irrecoverable fault.

15. A computer program product for fault processing, the computer program product comprising:
a non-transitory computer readable medium encoded with computer-executable code, the code configured to enable the execution of:
determining a plurality of devices to be detected and corresponding device attributes, the plurality of devices including a first device, the first device having a fault;

performing a first fault detection operation to detect the fault of the first device based on the corresponding device attributes of the first device, the first fault detection operation being based on a first fault diagnosis rule that is generic for the plurality of devices;

in response to the fault of the first device being detected in the performing of the first fault detection operation, performing a first fault processing for the first device, the first fault processing being based on a first fault processing rule that is generic for the plurality of devices, in response to the fault of the first device not being detected in the performing of the first fault detection operation, performing a second fault detection operation to detect the fault of the first device, the second fault detection operation being based on a second fault diagnosis rule that is specific to the first device; and having detected the fault of the first device in the performing of the second fault detection operation, performing a second fault processing for the first device, the second fault processing being based on a second fault processing rule that is specific to the first device.

* * * * *